United States Patent [19]

Thomassin

[11] 4,177,597
[45] Dec. 11, 1979

[54] FISHING LURE SIMULATING LIFELIKE MOVEMENT

[76] Inventor: Robert C. Thomassin, 20, rue Pasteur, Fontenay sous Bois, France

[21] Appl. No.: 789,692

[22] Filed: Apr. 21, 1977

[51] Int. Cl.² ............................................. A01K 85/00
[52] U.S. Cl. ...................................... 43/42.3; 43/42.23
[58] Field of Search ................... 43/42.02, 42.23, 42.3; D22/27

[56] References Cited

U.S. PATENT DOCUMENTS

| D. 220,839 | 6/1971 | Sabol | 43/42.3 X |
|---|---|---|---|
| 1,881,947 | 10/1932 | Rawdon | 43/42.3 X |
| 2,298,811 | 10/1942 | Sisco | 43/42.3 X |
| 2,491,846 | 12/1949 | Boekenogen et al. | 43/42.3 |
| 2,544,178 | 3/1951 | Pfahler | 43/42.3 |
| 2,607,151 | 8/1952 | Morris et al. | 43/42.3 X |
| 3,105,317 | 10/1963 | Fox | 43/42.3 X |
| 3,158,952 | 12/1964 | Creme | 43/42.02 X |
| 3,296,734 | 1/1967 | Johnson | 43/42.09 |
| 3,868,784 | 3/1975 | Sabol | 43/42.3 X |

*Primary Examiner*—Edward M. Coven
*Attorney, Agent, or Firm*—Weiser, Stapler & Spivak

[57] ABSTRACT

A fishing lure simulating the lifelike swimming motion of aquatic animals composed of at least one strip of flexible material containing at least two components which are essentially rectilinear and which form a variable angle between them.

5 Claims, 5 Drawing Figures

U.S. Patent Dec. 11, 1979 Sheet 1 of 2 4,177,597
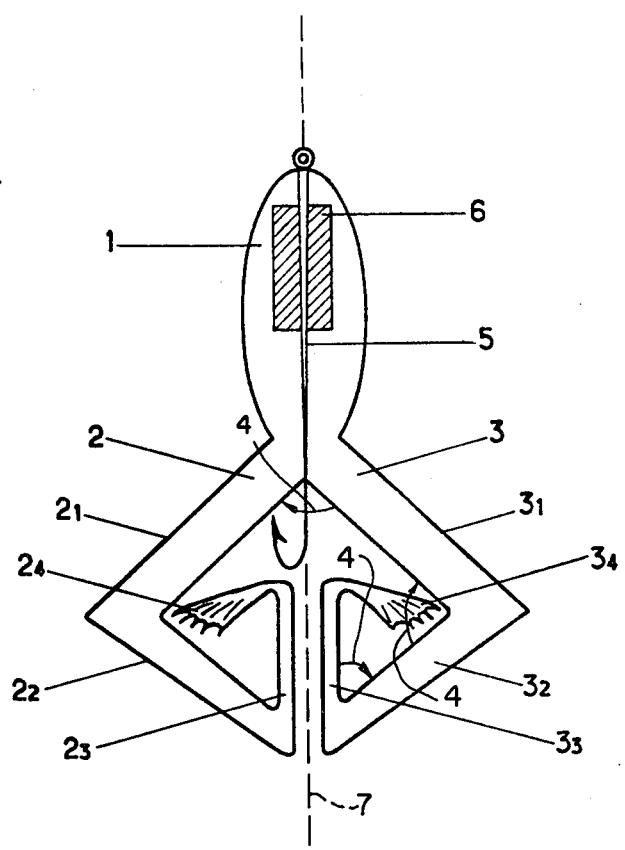
Figure: 1
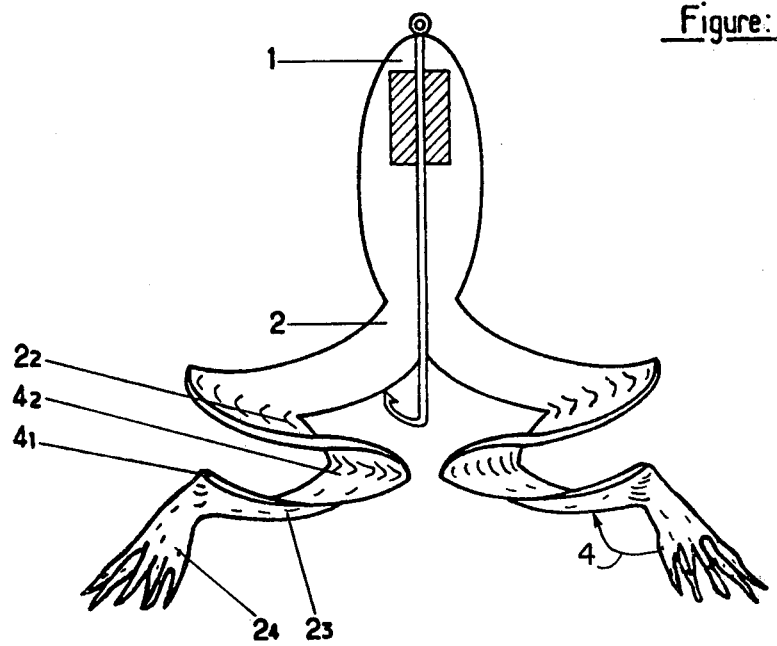
Figure: 2

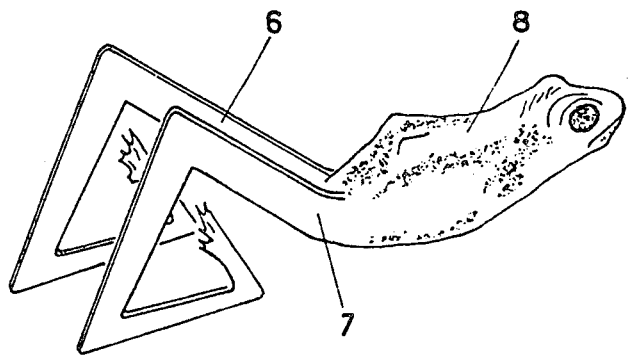
Figure: 3
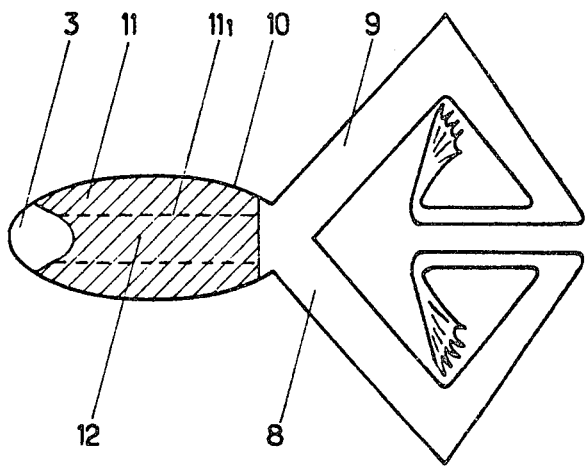
Figure: 4
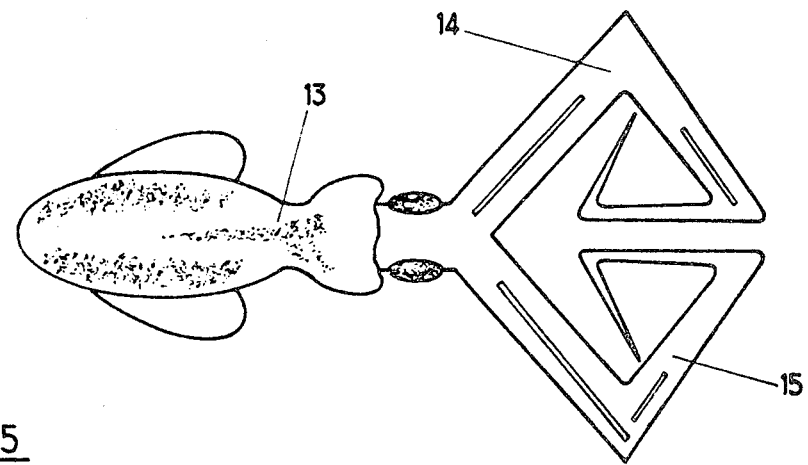
Figure: 5

FISHING LURE SIMULATING LIFELIKE MOVEMENT

This invention concerns a lure for use in fishing.

There already exist fishing simulating the lifelike swimming motion of aquatic animals lures in the shape of strips cut from sheets of flexible materials having curved portions that impart rotational and vibratory motions for the purpose of luring a fish when said device is made to trail in the water.

The aforementioned existing lures may be constructed, for example, in the form of a fish whose tail is smoothly curved or else in the form of a strip rolled into a spiral.

Nevertheless, these lures, when pulled through the water, do not make any appreciable axial movements, so that their length remains constant throughout their period of use, thus rendering impossible the constructions of certain artificial lures in the form of frogs, squid, octopi, cuttlefish, limpets, crayfish, etc.

The specific objective of this invention is to eliminate these drawbacks and, for this purpose, concerns a lure representing a particular fish consisting of a strip of flexible material incorporating at least two essentially straight portions forming a variable angle between them.

In accordance with another characteristic of this invention, the various straight portions of the strip are located within the same plane in the resting position of the lure.

In accordance with another characteristic of this invention, the strip incorporates more than two straight portions, these various portions all being folded in the same direction.

This invention is represented by non-limiting examples in the attached drawings where:

FIG. 1 is a top view of a lure in accordance with the invention constructed in the form of a frog.

FIG. 2 is a bottom view of the frog shown in FIG. 1 in one of the positions assumed during use.

FIG. 3 displays another method of constructing a lure in the form of a frog.

FIG. 4 shows a top view of another embodiment of this lure.

FIG. 5 displays the lure of this invention constructed in the form of a squid.

The lure of this invention is intended to simulate perfectly the swimming motions of aquatic animals possessing legs or tentacles such as frogs, squids, cuttlefish, limpets, crayfish, etc., due to the fact that the parts of this lure which simulate legs or tentacles are able to move at right angles to the direction of travel of the lure, as well as axially, that is, the various parts of the lure can not only assume positions in different planes with respect to each other, but can also alter their angular position so as to decrease or increase the total length of the lure, thus simulating the swimming motions of an aquatic animal.

This result is obtained in accordance with the invention by constructing at least one part of the lure from a strip of flexible material possessing at least two essentially rectilinear portions forming an angle between them characterized by the fact that, when the lure is towed within the water or on the surface of the water, the angle between the two straight portions increases or decreases due to the flexibility of the material, this alteration in the value of angle automatically producing a change in the plane of the two rectilinear portions with respect to each other.

In fact, it is observed that, during displacement of the lure in the water, an increase of the angle between the two linear portions produces buckling of the strip at the apex of the angle whereas a decrease of said angle produces buckling of the strip on the inside of the angle, thus producing a change in plane of the various rectilinear portions with respect to each other during the execution of the lengthening and shortening motions of the lure.

The example shown in FIG. 1 represents a lure constructed in the form of a frog consisting of a body 1 and two legs 2 and 3, each composed of essentially straight components $2_1$, $2_2$, $2_3$, $2_4$ and $3_1$, $3_2$, $3_3$, $3_4$.

This lure unit is preferably constructed by cutting a sheet of flexible material but it may also be fabricated by a molding process if it is desired to impart thickness to the lure so as to permit it to resemble an aquatic animal more closely.

In the example illustrated in FIG. 1, legs 2 and 3 of the lure are therefore constructed of flexible strips whose various rectilinear portions segments $2_1$ through $2_4$ and $3_1$ through $3_4$ form planar angles 4 with respect to each other, thus permitting achieving the desired type of motion of the lure when the latter is pulled through the water.

In the example shown in FIG. 1, the various portions of each leg or strip 2-3 that are cut from a flat sheet are folded in the same direction, the folds of one of the strips with respect to the other being therefore oriented in opposite directions so that the unit may be constructed symmetrically with respect to the axis of propulsion which also constitutes the longitudinal axis of the animal. The lure unit thus has an axis of symmetry, whose rearward extension is shown by broken line 7 in FIG. 1.

Nevertheless, it will be observed that the length of the straight portions of the two strips as well as the value of the angles formed by these two strips may be different if it is desired to achieve an asymmetrical construction that will produce an alternating or even random motion of the aquatic animal's two legs. Furthermore, depending on the type of motion desired, the various rectilinear portions of the strips or legs 2 and 3 may be furnished with longitudinal ribs or grooves for the purpose of increasing or decreasing the rigidity of a particular zone with respect to the other zones, thus producing a more realistic simulation of the animal represented by the lure.

FIG. 2 illustrates the lure of FIG. 1 in one of the positions which it may assume during its travel in the water.

For this purpose, it is observable that an increase of the value of the angle between portions $2_3$ and $2_4$ results in the formation of buckling at twisted loop $4_1$ at the apex of angle 4 which is formed by these two portions whereas a decrease of the value of the angle between portions $2_2$ and $2_3$ results in the formation of buckling on the inside twisted loop $4_1$ of angle 4 which is formed by these two portions.

In the embodiment illustrated in FIGS. 1 and 2, the lure is obtained by cutting a sheet of flexible material whose thickness will depend on the nature of said material. The hook 5 has an elongated shank portion, a substantial portion of which is embedded in the body 1 substantially coextensive with the longitudinal axis of the body. A sinker 6 may be attached, for example, by bonding or by insertion at a desired location on the body of the lure. Alternatively, an external hook and sinker assembly can be connected at the front end of the body 1.

Moreover, stiffening components may be attached at any place on the body of the lure or on strips 2 and 3 in order to impart to particular zones the desired rigidity which depends on the nature of the motion to be obtained within the water. In the case where this lure is obtained by cutting a sheet of flexible material, these reinforcements may be bonded, but they may also be obtained directly by molding if this lure is obtained by injection molding or by some other type of molding. In this case as well, body 1 of the lure may have a thickness that will impart to it the size of the simulated animal while strips 2-3 may also be thicker in the central region of rectilinear portions $2_1$, $2_2$, etc., the essential point being that the angles connecting the various rectilinear portions be thin (the thickness depending on the material employed) in order to impart a given amount of flexibility to them.

Furthermore, if this lure is produced by molding, it may prove to be advantageous to progressively modify the thickness of strips 2 and 3, beginning with parts $2_1$ and $3_1$ attached to body 1 and ending with parts $2_4$ and $3_4$ in order to modify the reactions of each of these parts with respect to the others within the water, it nevertheless being understood that parts having identical positions and shapes constructed on different strips will produce similar motions which may or may not be coordinated depending on the assembled structure of each of these strips.

Moreover, this lure, which is fabricated from a flexible material such as plastic or rubber, may be constructed totally or partially by using cellular-type materials, preferably incorporating closed cells, thus making it possible to obtain, in a simple manner, a lure whose shape, size and density are the same as those of real bait.

In the example illustrated by FIGS. 1 and 2, strips 2 and 3, which form an integral part of body 1, are located in the same plane in the resting position of the lure.

Nevertheless, any other arrangement may be obtained. For example, the two strips 2 and 3 may be located in different planes but preferably symmetrically with respect to the axial plane perpendicular to body 1. Such construction will permit, for example, obtaining a V-shaped arrangement of strips 2 and 3 which will be more or less open, depending on the animal to be simulated.

In the embodiment illustrated in FIG. 3, the two strips 6 and 7, which simulate the two rear legs of bait whose body 8 is in the form of a frog, are arranged in adjacent parallel planes which are symmetrical with respect to the vertical axial plane of the lure. However, any other angular position of the two strips intermediate between the parallel arrangement of strips 6 and 7, shown in FIG. 3, and the arrangement within the same plane of strips 2 and 3, shown in FIG. 1, may be adopted, as has already been indicated.

The example illustrated in FIG. 4 is a lure, which is shaped like a frog, and whose two strips 8 and 9 simulate the legs, while part 10, which connects these two strips, simulates the body. Nevertheless, in this case, body 10 is fabricated as two separate parts. One of these is sleeve 11, which is perforated axially along $11_1$ and which provides the external shape of the body of the lure, while the other part 12 consists of a shaft that is attached to strips 8 and 9, its free end terminating in bulge 3 whose exterior surface constitutes an extension of the external contour of sleeve 11, thus completing the shape of the lure.

In this case, it is preferable that the components of this lure be made of different materials, either natural or colored, and that assembly be achieved simply by fitting shaft 12 within axial opening $11_1$ of sleeve 10.

FIG. 5 illustrates an embodiment of this invention which is a lure constructed in the form of a cuttlefish whose body 13 is provided with two tentacles 14 and 15, the various components of which form angles constituting zones of articulation that permit their moving freely.

It is understood that a hook and/or weight assembly can be provided in connection with the embodiments of FIGS. 3-5, either embedded within the body portions as shown in FIGS. 1 and 2, or located externally and connected at the front end of the lure.

Naturally, this invention is not limited to the embodiments described and illustrated above. Other methods and constructional forms can be derived from these while remaining within the scope of this invvention.

What is claimed is:

1. A fishing lure capable of simulating the lifelike swimming motion of aquatic animals comprising:
   a main body portion having an axis of symmetry;
   at least two movable members formed of flexible, resilient material and projecting from said body;
   each of said members comprising at least three rectilinear shaped segments, each of which has a width greater than its thickness, and all of the segments of each member being oriented so that in the initial non-swimming position of the lure, the segments all lie with their widths in the same plane and form angles with one another,
   a first segment of each said member connected at one end to said body and extending at an acute angle away from a rearward extension of the axis of symmetry of said body,
   a second segment of each said member connected at its one end to the other end of said first segment and extending towards the said rearward extension of the axis of symmetry at an acute angle with respect to said rearward extension;
   a third segment of each said member connected to the other end of said second segment and extending forward toward said body in a direction substantially parallel with the said rearward extension of the axis of symmetry; and
   said members, when the lure is placed in a body of water and subjected to the pull of a fishing line to which the lure is attached, exhibiting lifelike swimming motion of aquatic animals due to the action of a continuous stream of water caused by the pull of the lure through the water whereby the segments of each member resiliently deviate from their initial angled positions, thereby changing the angle between each segment and the relative position of the plane of each segment.

2. A lure as defined in claim 1, wherein said members, in their initial position, extend from opposite sides of the body and are disposed in substantially the same plane.

3. A lure as defined in claim 1, wherein said members, in their initial position, extend from said body in at least two different parallel planes.

4. A lure as defined in claim 1, wherein said body comprises two dissimilar portions, a first portion being in the form of a shank having at one end said members extending therefrom and at the opposite end an enlarged segment, and a second portion in the form of a sleeve adapted to receive said shank therein and conforming to the contour of the enlarged segment of the shank.

5. A lure as defined in claim 1, wherein the third segment of each said member has a fourth segment attached to the end of the third segment remote from that at which the third segment is connected to the second segment, said fourth segment extending away from the extension of the axis of symmetry and in the direction of the inner edge of the angle formed by the first and second segments of said member.

* * * * *